(12) United States Patent
Pina et al.

(10) Patent No.: US 10,964,439 B2
(45) Date of Patent: Mar. 30, 2021

(54) SOLLER SLIT, X-RAY DIFFRACTION APPARATUS, AND METHOD

(71) Applicant: RIGAKU CORPORATION, Tokyo (JP)

(72) Inventors: Ladislav Pina, Prague (CZ); Adolf Inneman, Prague (CZ); Kazuhiko Omote, Tokyo (JP); Shintaro Kobayashi, Tokyo (JP)

(73) Assignee: RIGAKU CORPORATION, Tokyo (JP)

( * ) Notice: Subject to any disclaimer, the term of this patent is extended or adjusted under 35 U.S.C. 154(b) by 0 days.

(21) Appl. No.: 16/169,251

(22) Filed: Oct. 24, 2018

(65) Prior Publication Data

US 2019/0122782 A1 Apr. 25, 2019

(30) Foreign Application Priority Data

Oct. 25, 2017 (JP) .............................. JP2017-206176

(51) Int. Cl.
*G21K 1/06* (2006.01)
*G01N 23/20016* (2018.01)
(Continued)

(52) U.S. Cl.
CPC ............. *G21K 1/06* (2013.01); *G01N 23/207* (2013.01); *G01N 23/20016* (2013.01); *G21K 1/025* (2013.01)

(58) Field of Classification Search
CPC ........ G21K 1/06; G21K 1/025; G01N 23/207; G01N 23/20016
See application file for complete search history.

(56) References Cited

U.S. PATENT DOCUMENTS 3,124,681 A * 3/1964 Zingaro ............. G01N 23/2076
378/49
4,580,283 A * 4/1986 Hornstra ............. G01N 23/2076
378/82
(Continued)

FOREIGN PATENT DOCUMENTS

JP 4-236348 A 8/1992
JP H 09-33458 A 2/1997
(Continued)

OTHER PUBLICATIONS

Brewer, Brian, Soller slit design and characteristics, 2012, J. Synchrotron Rad., vol. 19, pp. 185-190. (Year: 2012).*

*Primary Examiner* — Christine S. Kim
(74) *Attorney, Agent, or Firm* — Birch, Stewart, Kolasch & Birch, LLP

(57) ABSTRACT

An X-ray diffraction apparatus having a solar slit, and a method for preventing the diffraction image on a detector from spreading in the in-plane direction even when an X-ray irradiation region spreads over the sample surface due to measurement by GIXD, thereby allowing for measurement with a short measurement time and a high resolution. The soller slit 100 includes a plurality of metallic thin plates 110, each being perpendicular to the bottom surface, which are arcuately arranged with a predetermined angular interval between each other so as to pass X-rays in a radiating direction from a particular focus, the soller slit being provided to be used at a position through which X-rays diffracted on a sample surface pass, the particular focus being the center of a goniometer circle, the X-rays being irradiated on a sample at an angle for GIXD.

6 Claims, 9 Drawing Sheets

(51) Int. Cl.
*G01N 23/207* (2018.01)
*G21K 1/02* (2006.01)

(56) References Cited

U.S. PATENT DOCUMENTS

| | | | |
|---|---|---|---|
| 5,373,544 A | 12/1994 | Goebel | |
| 5,936,255 A | 8/1999 | Nakanishi et al. | |
| 7,035,373 B2 | 4/2006 | Omote | |
| 7,860,217 B2 * | 12/2010 | Ozawa | G01N 23/20 378/71 |
| 7,983,389 B2 * | 7/2011 | Ollinger | G21K 1/02 378/147 |
| 2004/0190681 A1 | 9/2004 | Omote | |
| 2004/0228440 A1 * | 11/2004 | Vigliante | G01N 23/207 378/71 |
| 2014/0119512 A1 | 5/2014 | Matsushita et al. | |
| 2017/0363550 A1 * | 12/2017 | Kobayashi | G01C 9/00 |

FOREIGN PATENT DOCUMENTS

| | | | |
|---|---|---|---|
| JP | 9-281061 A | 10/1997 |
| JP | H 10-19808 A | 1/1998 |
| JP | H 11-287773 A | 10/1999 |
| JP | 2977166 B2 | 11/1999 |
| JP | 2003-254917 A | 9/2003 |
| JP | 2004-294136 A | 10/2004 |
| JP | 2014-89143 A | 5/2014 |

\* cited by examiner

| | |
|---|---|
| EXTERNAL DIMENSION OF HOUSING | 80 × 40 × 45.5mm |
| THIN PLATE INTERVAL AT INCIDENT SIDE | 0.56mm |
| THIN PLATE INTERVAL AT EMISSION SIDE | 0.85mm |
| THICKNESS OF THIN PLATE | 0.1mm |
| NUMBER OF THIN PLATES | 91 |
| LENGTH OF THIN PLATE | 40mm |

FIG. 2

SOLLER SLIT, X-RAY DIFFRACTION APPARATUS, AND METHOD

CROSS-REFERENCE TO RELATED APPLICATION

This application claims priority to Japanese Patent Application No. 2017-206176, filed Oct. 25, 2017, the contents of which are incorporated herein by reference in their entirety.

BACKGROUND OF THE INVENTION

The present invention relates to a soller slit including a plurality of thin plates, an X-ray diffraction apparatus and a method using the same.

DESCRIPTION OF THE RELATED ART

In recent years, studies on functional organic thin film applied to transistors or solar cells have been drawing attention. In-plane orientation measurement using in-plane diffraction is effective for evaluation of organic thin film. When measuring in-plane diffracted X-rays, structure analysis in the laminating direction is possible, as well as the in-plane direction. For measurement of in-plane diffracted X-rays, there has been conventionally performed a detection method with a zero-dimensional detector using parallel soller slits, as described in Japanese Patent Laid-Open No. H11-287773, for example.

However, such a method involves movement of the detector for pursuing the measurement, which requires a large amount of time to complete measurement over a desired range. In contrast, irradiating radiation light on a sample with a narrowed beam size in a radiation facility, and detecting in-plane diffracted X-rays with a two-dimensional detector allows for measurement of diffraction spots in both the in-plane direction and the out-of-plane direction.

On the other hand, conventionally there is known a method of detecting diffracted X-rays using a soller slit, in fields other than in-plane diffraction. For example, Japanese Patent Laid-Open No. H10-19808 describes the use of a special rotating slit for detecting, with an imaging plate, only the X-rays in the radiating direction of diffracted X-rays and fluorescence X-rays emitted from the surface of a thin-film sample.

Japanese Patent No. 2977166 describes the reception of diffracted X-rays into a wide-range X-ray detector via slit members provided between the sample and the wide-range X-ray detector. The slit members are arranged in alignment with each other in a manner facing an X-ray detection region of the wide-range X-ray detector such as for example a PSPC, forming a curve as a whole so as to conform to an arcuate trajectory centered on the center axis line ω of the X-ray irradiation surface of the sample.

Japanese Patent Laid Open No. H9-33458 describes a vibrating soller slit which is deployed in the optical path of reflected rays, or in the optical paths of both of reflected rays and incident rays, and vibrates or performs a uniform linear motion in the direction of lamination of a plurality of parallel soller slit boards. The problem that X-rays of a uniform intensity become non-uniform on the detector due to the soller slit boards is solved by vibration of the vibrating soller slit.

U.S. Pat. No. 5,373,544 describes that only the X-rays scattered by the sample are measured by a collimator whose thin plates are radially aligned relative to the sample placed at the center of the measurement circle, and that the other beams are shielded by the collimators.

When performing in-plane orientation measurement on the basis of in-plane diffraction as described above, using radiation light allows for narrowing the incident beam size, and therefore it is possible to perform an efficient and high-resolution measurement. However, it is not possible to sufficiently narrow the incident X-ray beam size when using X-rays available in a laboratory. FIG. 8 illustrates conventional in-plane diffraction spots. As illustrated in FIG. 8, the X-ray irradiation region created by a small-angle incidence in a laboratory spreads over the sample surface, whereby the diffraction image on the two-dimensional detector extends in the in-plane direction, resulting in a lower resolution.

It is an object of the present invention, which has been made in view of the aforementioned circumstances, to provide a soller slit, an X-ray diffraction apparatus, and a method for preventing the diffraction image on the detector from spreading in the in-plane direction even when the X-ray irradiation region spreads over the sample surface due to measurement by GIXD (Grazing Incident X-ray Diffraction), thereby allowing for measurement with a short measurement time and a high resolution.

SUMMARY OF THE INVENTION

In order to achieve the aforementioned object, a soller slit of the present invention includes a plurality of thin plates, each being perpendicular to the bottom surface, which are arcuately arranged with a predetermined angular interval between each other so as to pass X-rays in a radiating direction from a particular focus, the soller slit is provided to be used at a position through which X-rays and diffracted on a sample surface pass, the particular focus being the center of a goniometer circle, the X-rays being irradiated on a sample at an angle for GIXD. Accordingly, the diffraction image on the detector is prevented from spreading in the in-plane direction even when the X-ray irradiation region spreads over the sample surface due to measurement by GIXD, whereby it allows for performing measurement with a short measurement time and a high resolution.

In addition, in the soller slit of the present invention, the resolution in the in-plane direction is equal to or lower than 1°. Since the angular interval between the thin plates of the soller slit is narrow with a high precision, performing X-ray diffraction measurement with a resolution equal to or lower than 1° in the in-plane direction is allowing for.

In addition, an X-ray diffraction apparatus of the present invention, which is an X-ray diffraction apparatus including the aforementioned soller slit, further includes an X-ray source configured to irradiate X-rays on the sample; an in-plane arm rotatably provided relative to the center of the goniometer circle; and a detector provided on the in-plane arm and configured to detect diffracted X-rays which have passed through the soller slit in a one-dimensional or two-dimensional detection region, and the soller slit is provided at a position through which X-rays diffracted on a sample surface pass, the particular focus being the center of a goniometer circle, the X-rays being irradiated on a sample at an angle for GIXD. Such a configuration allows for measurement of X-rays which have passed through the soller slit, whereby allowing for measurement with a high resolution in the in-plane direction.

In addition, the X-ray diffraction apparatus of the present invention further includes a TDI (Time Delay and Interrogation) control unit configured to calculate a detected X-ray intensity on a detected position in space, in accordance with the detected position of the X-ray intensity on the detector and the rotation angle of the in-plane arm. Employing a TDI scheme as described above makes it easy to dissipate shadows of the thin plates that may appear when performing measurement with the detector and the soller slit being fixed relative to the in-plane direction.

In addition, the X-ray diffraction apparatus of the present invention further includes a swing mechanism having the soller slit to allow the soller slit to swing with the particular focus as the center. Swinging of the soller slit makes it easy to dissipate shadows of the thin plates that may appear when performing measurement with the detector and the soller slit being fixed relative to the in-plane direction.

In addition, a method of the present invention is a method of measuring diffracted X-rays using the aforementioned soller slit, the method including: a step of providing the soller slit at a position through which X-rays diffracted on a sample surface pass, the particular focus being the center of a goniometer circle; and a step of irradiating X-rays on the sample at an angle for GIXD, and detecting X-rays diffracted by the sample, with a detector via the soller slit. Accordingly, the diffraction image on the detector is prevented from spreading in the in-plane direction even when the X-ray irradiation region spreads over the sample surface due to measurement by GIXD, whereby allowing for performing measurement with a short measurement time and a high resolution.

According to the present invention, the diffraction image on the detector is prevented from spreading in the in-plane direction even when an X-ray irradiation region spreads over the sample surface due to measurement by GIXD, whereby allowing for performing measurement with a short measurement time and a high resolution.

BRIEF DESCRIPTION OF THE DRAWINGS

FIG. 2 is a table listing an example of parameters of the soller slit of the present invention;

DETAILED DESCRIPTION OF THE INVENTION

Figure 1A:
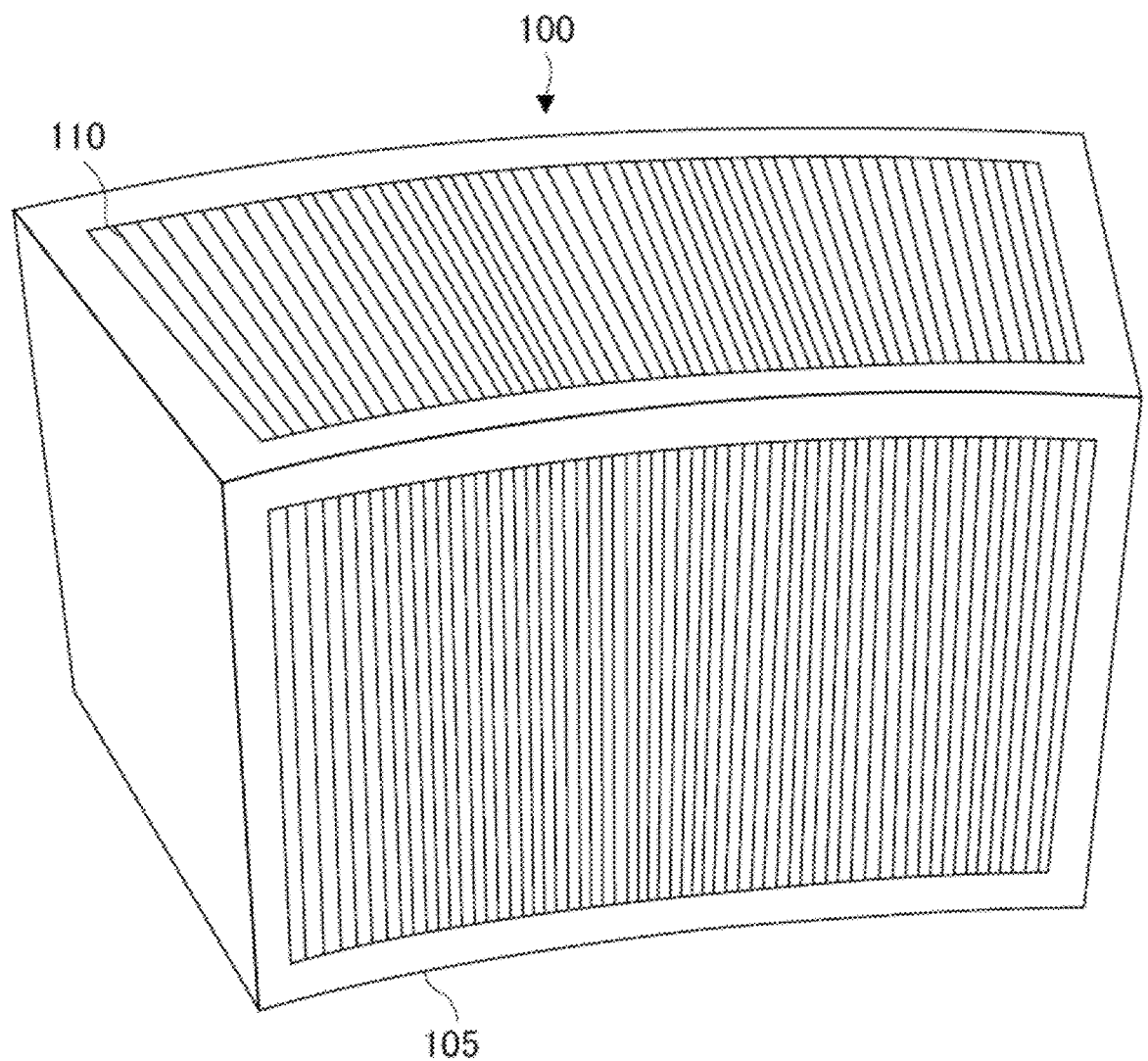
FIGS. 1A and 1B are a perspective view and a plan view, respectively illustrating a configuration of a soller slit of the present invention.

Next, embodiments of the present invention will be described, referring to the accompanying drawings. For simplicity of explanation, identical components are provided with identical reference numerals throughout the drawings, with duplicate description being omitted.

Figure 1B:
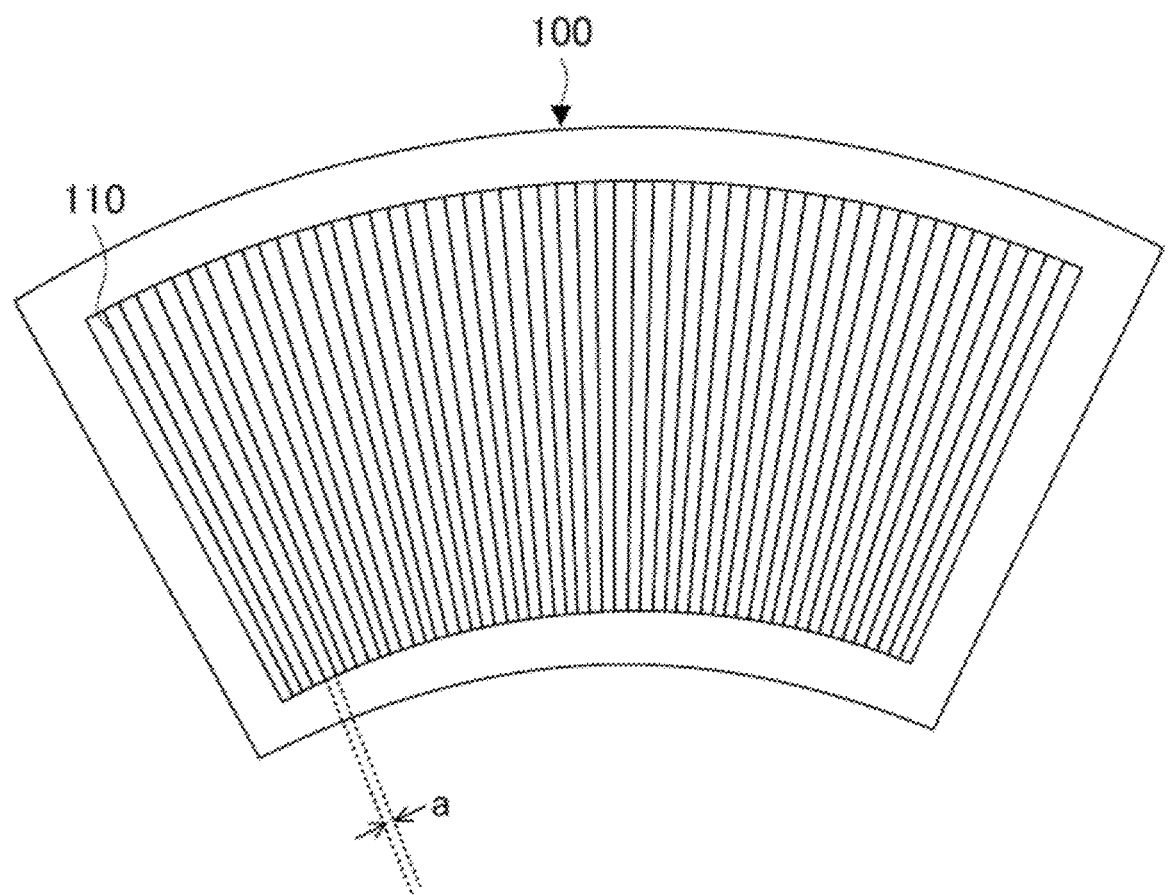

FIGS. 1A and 1B are a perspective view and a plan view, respectively illustrating a configuration of a soller slit 100. The soller slit 100 is an optical element including a plurality of thin plates 110. The thin plates 110, each being perpendicular to a bottom surface 105, are formed by a metallic X-ray shielding member such as SUS, for example, and arcuately arranged with a predetermined angular interval a between each other of the adjacent plates so as to pass X-rays in a radiating direction from a particular focus. Therefore, when seen from a direction perpendicular to the bottom surface 105, the soller slit 100 is formed in a shape (arcuate) obtained by cutting a small-diameter sector from a large-diameter sector. Note that, although the thin plates 110 are preferred to be rectangular considering the ease of arrangement in an arcuate shape, they may have other shapes. The housing of the soller slit 100 is made of a rigid material such as for example duralumin, with the angular interval a between the plurality of thin plates 110 being precisely maintained.

The soller slit 100 is provided to be used at a position through which X-rays diffracted on a sample S surface pass, the particular focus (the center of the arc) being the center of a goniometer circle G0, the X-rays being irradiated on a sample at an angle for GIXD. The GIXD method is one of the structure evaluation methods that evaluate the molecule cohesion structure, the crystal structure, and the crystal orientation of a sample surface or a thin-film sample using X-ray total reflection phenomena. According to the aforementioned configuration, the diffraction image on the detector is prevented from spreading in the in-plane direction even when the X-ray irradiation region spreads over the sample surface due to measurement by GIXD, whereby allowing for performing measurement with a high resolution in the in-plane direction.

FIG. 2 is the table listing an example of parameters of the soller slit 100. For example, the soller slit 100 manufactured on the basis of the parameters indicated in FIG. 2 has the adjacent thin plates 110 arcuately arranged with a predetermined angular interval of 0.4° between each other with a particular focus as the center. It is preferred that the angular interval is provided so that the resolution of measurement of diffracted X-rays in the in-plane direction becomes equal to or lower than 1°.

Figure 3:
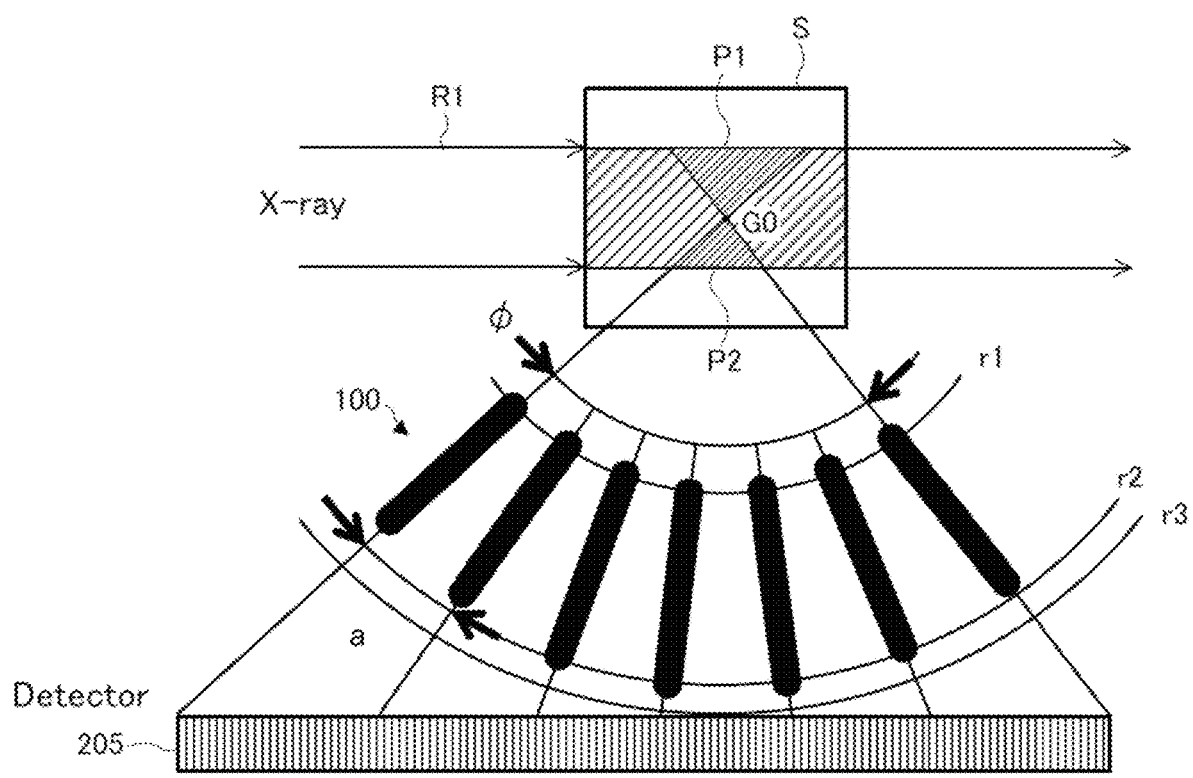
FIG. 3 is a schematic view illustrating a shape and a function of the soller slit of the present invention.

FIG. 3 is a schematic view illustrating the shape and the function of the soller slit 100. In the example of FIG. 3, regions P1 and P2 which diffracts X-rays into a detector 205 with the focus of a center G0 of the goniometer circle are the targets of measurement within a region of a sample S irradiated by an X-ray R1. The diffracted X-rays which have passed through the center G0 of the goniometer circle and passed through the interval of the thin plates 110 of the soller slit 100 are detected by the detector 205.

The inner circular arc and the outer circular arc forming the arcuate exterior shape of the soller slit 100 have curvature radiuses r1 and r2, respectively. In addition, the distance between the center G0 of the goniometer circle and the detector 205 is r3, and the detector 205 is preferred to be located at a position slightly farther than the curvature radius r2 of the outer circular arc from G0, as illustrated in FIG. 3. However, this is only exemplary and the arrangement or size of the soller slit 100 or the like may change in accordance with application. The detector 205 detects X-rays which have passed through the interval of the thin plates 110 adjacent to each other at the angular interval a.

Figure 4:
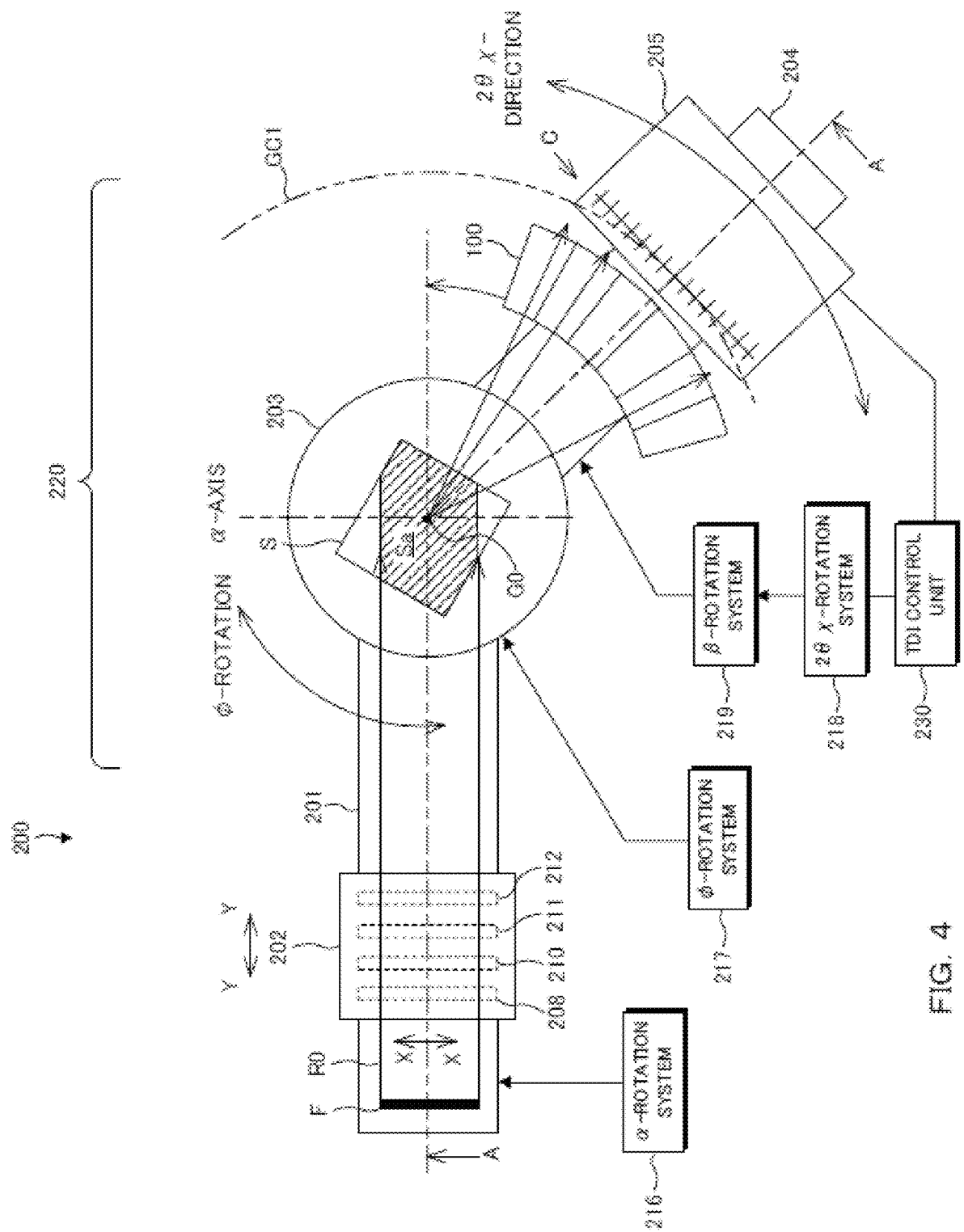
FIG. 4 is a plan view illustrating a configuration of an X-ray diffraction apparatus of the present invention.
Figure 5:
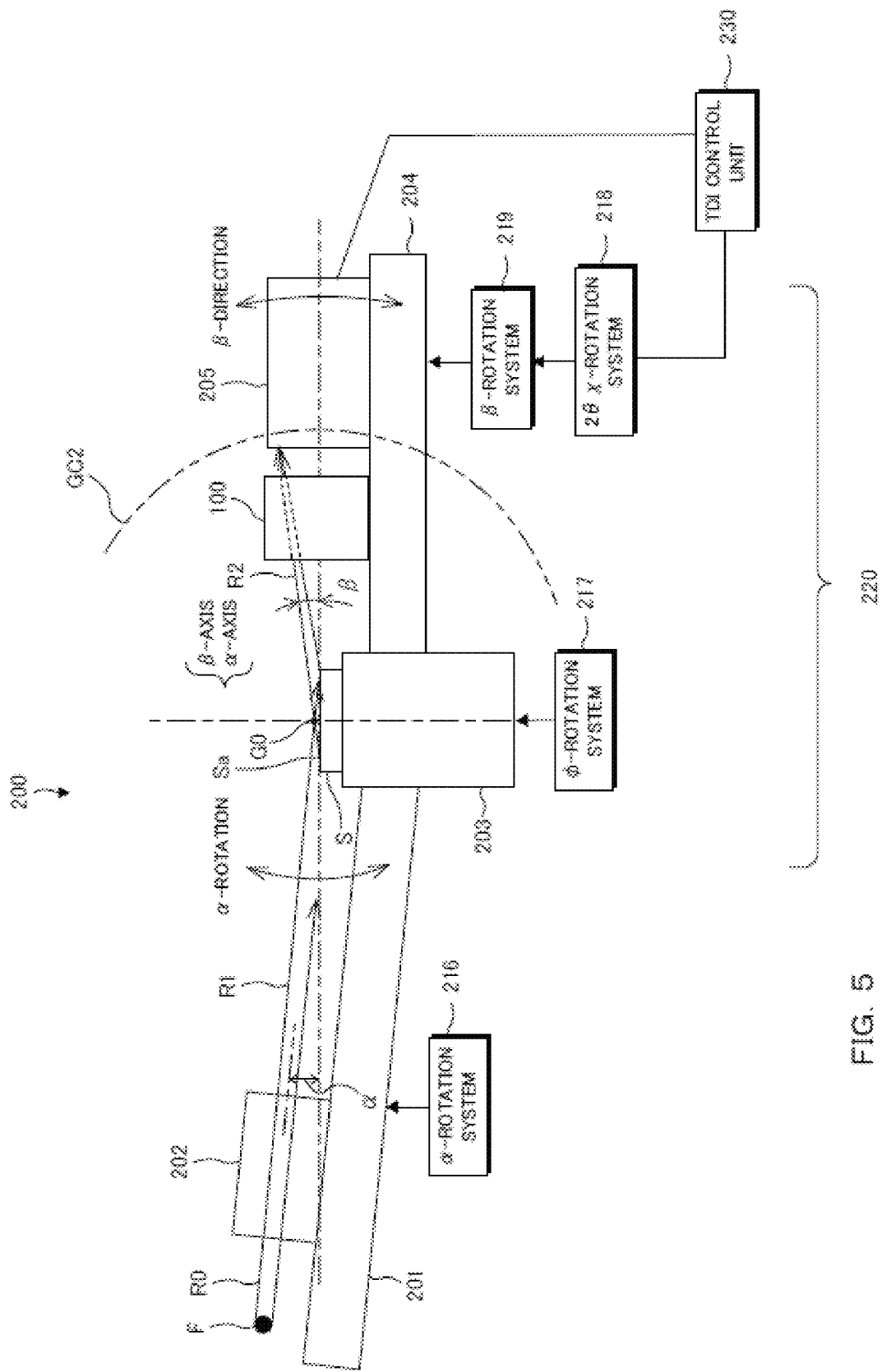
FIG. 5 is a side view illustrating a configuration of an X-ray diffraction apparatus of the present invention.

FIG. 4 is a plan view illustrating a configuration of an X-ray diffraction apparatus 200, and FIG. 5 is a side view taken along A-A of FIG. 4. The X-ray diffraction apparatus 200 has an X-ray source F, an incident angle rotating arm 201, an incident optical system 202, a sample stage 203, an in-plane arm 204, the soller slit 100 and the detector 205. The X-ray diffraction apparatus 200 is, for example, an in-plane X-ray diffraction apparatus, an in-plane reciprocal lattice mapping apparatus, a GI-WAXS/SAXS apparatus (Grazing-Incidence Wide-Angle X-Ray Scattering/Small-Angle X-Ray Scattering apparatus), or the like.

The X-ray source F generates line-focused X-rays. The longitudinal direction of the X-ray source F is a direction parallel to a surface Sa of the sample S. The incident optical system 202 is configured to increase the parallelism of the line-focused X-rays so that the X-rays are incident on the sample S at an angle close to the surface Sa. The incident angle rotating arm 201 is connected to an α-rotation system 216 so as to be rotatable by the drive of the α-rotation system 216 about the center G0 of a goniometer circle GC2. The incident angle rotating arm 201 has the incident optical system 202 provided thereon. The incident optical system 202 includes, in the order from the side of the X-ray source F, a paraboloid multi-layered film mirror 208, an in-plane PSC (Parallel Slit Collimator) 210, a longitudinal limiting slit 211, and an incident slit 212.

The paraboloid multi-layered film mirror 208 is an X-ray mirror having a plurality of heavy element layers and a plurality of light element layers alternately laminated, thereby forming a surface that reflects X-rays on the paraboloid. X-rays R0 emitted from the X-ray source F are shaped into parallel monochromatic X-rays by the paraboloid multi-layered film mirror 208.

The in-plane PSC 210 is an X-ray optical element having a large number of thin X-ray shielding members extending in the X-ray traveling direction (Y-Y direction) and the direction perpendicular to the sample surface, the X-ray shielding members being arranged parallel to each other in the X-X direction (direction across the X-ray optical path). The in-plane PSC 210 allows for increasing the parallelism of the X-rays in the longitudinal direction.

The longitudinal limiting slit 211 is a slit that limits spreading of the X-rays which have exited the in-plane PSC 210 in a direction in the sample surface. The incident slit 212 is a slit that limits the beam size in the width direction of the X-rays which have exited the longitudinal limiting slit 211. Note that the aforementioned longitudinal direction refers to a direction parallel to the long side of the beam profile of X-rays, and the width direction refers to a direction perpendicular to the longitudinal direction on the beam profile.

The sample stage 203 has a sample placing surface, on which the sample S of the thin film is placed. The sample S may be adhered to the sample stage 203. X-rays are irradiated on the surface Sa of the sample S. The X-ray R1 which has exited the incident optical system 202 enters a region indicated by slanted lines of the surface Sa of the sample S. On this occasion, X-rays diffracted on a crystal lattice surface perpendicular to the surface Sa in the sample S and passed through the soller slit 100 are detected by the detector 205. Note that it is preferred to assume that thin film is the target of measurement by the X-ray diffraction apparatus 200, and it is particularly suitable to measure an organic polymer film such as pentacene.

The in-plane arm 204 is connected to a 2θχ-rotation system 218 so as to be rotatable by the drive of 2θχ-rotation system 218 about the center G0 of a goniometer circle GC1. The in-plane arm 204 has the detector 205 provided thereon. It is preferred that also the soller slit 100 is provided on the in-plane arm 204.

The soller slit 100 is provided between the sample S and the detector 205. The soller slit 100 selects only the diffracted X-rays passing by the center G0 of the goniometer circle GC1, thereby increasing the positional resolution at the position of the detector 205. Since only the X-rays passing through or by the center G0 of the goniometer circle GC1 are passed to the detector 205, it is possible to prevent spreading of X-rays diffracted by the sample S. Preventing spreading of X-rays diffracted by the sample S in a parallel-beam X-ray diffraction apparatus as described above allows for obtaining clear and high-resolution X-ray diffraction images. Note that, with regard to adjustment of the installation position of the soller slit 100, it suffices to install the soller slit 100 with adjusting the distances to the sample stage 203 and the detector 205 on the in-plane arm 204, without any position adjustment mechanism or the like being required. With the region to be measured on the sample S being large, it is possible to obtain sufficient results although the installation position is not very precise.

The detector 205, which is a one-dimensional or two-dimensional detector provided on the in-plane arm 204, detects diffracted X-rays which have passed through the soller slit 100 in a detection region. The detector 205 outputs electric signals corresponding to the intensity of the detected X-rays. The detector 205 is formed by, for example, a photo-counting (photon-counting) X-ray detector, a CCD (Charge Coupled Device) X-ray detector, or the like. It is preferred that the detector 205 is a two-dimensional detector. In such a case, simultaneously detecting X-rays on a two-dimensional detection surfaces is allowed for, thereby allowing for high-resolution detection with a short measurement time.

In the example illustrated in FIGS. 4 and 5, the incident optical system 202 is arranged on the incident angle rotating arm 201, and the sample stage 203 is arranged on a φ-rotation system 217. On the other hand, the detector 205 is arranged on a 2θχ (theta chi)-rotation system 218 and a β-rotation system 219 via the in-plane arm 204. The α-rotation system 216, the φ-rotation system 217, the 2θχ rotation system 218, and the β-rotation system 219 form a goniometer 220.

The φ-rotation system 217 rotates the sample stage 203 about a φ-axis line perpendicular to the sample surface. In other words, φ-rotation causes in-plane rotation of the sample S placed on the sample stage 203. The α-rotation system 216 rotates the incident optical system 202 about an α-axis line in FIG. 4. The α-axis line is an incident angle (incident optical system angle) axis line, which is an axis line parallel to the sample surface and orthogonal to the direction of travel of the X-ray R1 incident on the sample S. The α-rotation can change the incident angle α relative to the sample S of the X-ray R1 incident on the sample S placed on the sample stage 203.

The incident optical system 202 is mounted on the α-rotation system 216. Actuation of the α-rotation system 216 changes the incident angle α relative to the sample S.

The β-rotation system 219 rotates the detector 205 about the β-axis line. The β-rotation is a rotation in an out-of-plane direction. The β-axis line is an emission angle (detector angle) axis line, which is parallel to the sample surface. The β-rotation causes the detector 205 to rotationally move toward the Qz-axis direction of the reciprocal lattice space.

The 2θχ-rotation system 218 rotates the detector 205 about a 2θχ-axis line perpendicular to the sample surface. The 2θχ-rotation, which is a rotation in the in-plane direction, rotationally moves the detector 205 toward the Qx axis direction of the reciprocal lattice space.

The α-axis line, the φ-axis line, the β-axis line, and the 2θχ-axis line all pass through the center G0 of the goniometer circle GC1. Angle measurement by the detector 205 is performed by a pixel reading operation. The detector 205 allows for rotationally moving about the point G0, with the goniometer circle GC1 being the rotational movement trajectory. In such a case, the diffraction angle measured by the detector 205 is an angle $2\theta\chi$ along the goniometer circle GC1 centered on the point G0.

Note that the goniometer circle is not limited to the goniometer circle GC1 along the in-plane direction ($2\theta\chi$ directions) illustrated in FIG. 4, and may also be contemplated in an out-of-plane direction ($\beta$ direction) orthogonal to the in-plane direction ($2\theta\chi$ direction). The center point of the goniometer circle GC2 in the out-of-plane direction is identical to the center G0 of the goniometer circle GC1 in the in-plane direction.

The rotation systems 216, 217, 219 and 218 associated with the a-axis line, the $\varphi$-axis line, the $\beta$-axis line, and the $2\theta\chi$-axis line include a rotating machine (e.g., servo motor or pulse motor) allowing for controlling the rotation angle with a high precision, a worm gear (combination of worm and worm wheel) that transmits the torque, or the like.

A TDI control unit 230 causes the detector 205 to detect X-rays while moving the detector 205 continuously or stepwise at a predetermined speed. In accordance with the crystallinity of the sample S, the $\varphi$ angle position of the sample S may be varied by synchronized rotation or may be fixed so as to allow for $2\theta\chi/\varphi$ synchronized scan or fixed-$\varphi$ $2\theta\chi$ scan. The timing of detection and the timing of move of the detector 205 is synchronized so as to associate the positions of the detector 205 along its move with the detected positions on the detector 205. TDI control unit 230 accumulates the X-ray intensity detected on the detected position in space, in accordance with the detected position of the X-ray intensity on the detector 205 and the rotation angle of the in-plane arm 204. Accordingly, it is possible to easily dissipate shadows of the thin plates 110 that may appear when performing measurement with the detector 205 and the soller slit 100 being fixed.

First the soller slit 100 is provided at a position through which X-rays diffracted on the sample surface pass, with the center G0 of the goniometer circle being a particular focus. The sample S is then placed on the sample stage 203. The sample S is thin film such as pentacene, for example. Next, the $\alpha$-rotation system 216 is actuated to set the X-ray incident angle $\alpha$ to a low angle which is slightly smaller than the total reflection critical angle of the sample S. Furthermore, the angle of the detector 205 in the in-plane direction is set to a predetermined angle corresponding to the crystal lattice surface in the film of the sample S.

In this state, X-rays are emitted from the X-ray source F, and X-rays are irradiated on the sample S at an angle for the GIXD. The X-rays diffracted by those oriented to a predetermined direction, of the lattice surfaces in the thin film, are detected by the detector 205 via the soller slit 100. On this occasion, the detector 205 detects X-ray intensities simultaneously at a plurality of $2\theta\chi$ positions using a large number of planarly provided pixels.

Irradiating the X-ray R1 on the surface Sa of the sample S at a low angle $\alpha$ close to the critical angle causes X-rays to be reflected at an angle $\alpha$ equal to the incident angle $\alpha$. When, on the other hand, there exists a lattice surface perpendicular to the sample surface Sa and a diffraction condition is satisfied, the diffraction line appears close to the sample surface Sa. The diffraction phenomenon is referred to as in-plane diffraction. In-plane diffraction measurement, in which the incident X-ray R1 invades the interior of the sample S to a very little extent (equal to or less than several nm), measures only thin film and therefore obtains clear in-plane X-ray diffraction images.

$2\theta\chi/\varphi$ scan is performed. First, an intensity of a diffracted X-ray is measured by the detector 205 located at an initial angle position. Next, the detector 205 is rotated about the $2\theta\chi$-axis line (i.e., $2\theta\chi$-rotation) which is the same axis line as the $\varphi$-axis line, and accordingly, the sample S is rotated about the $\varphi$-axis line by half as much as $2\theta\chi$ (i.e., ($\varphi$-rotation), whereby the intensity of the diffracted X-ray is measured. The process is repeated continuously or stepwise. Plotting, on a two-dimensional coordinate system, the intensity information of diffracted X-rays at a plurality of positions obtained as described above provides an in-plane reciprocal lattice mapping chart.

Figure 6:
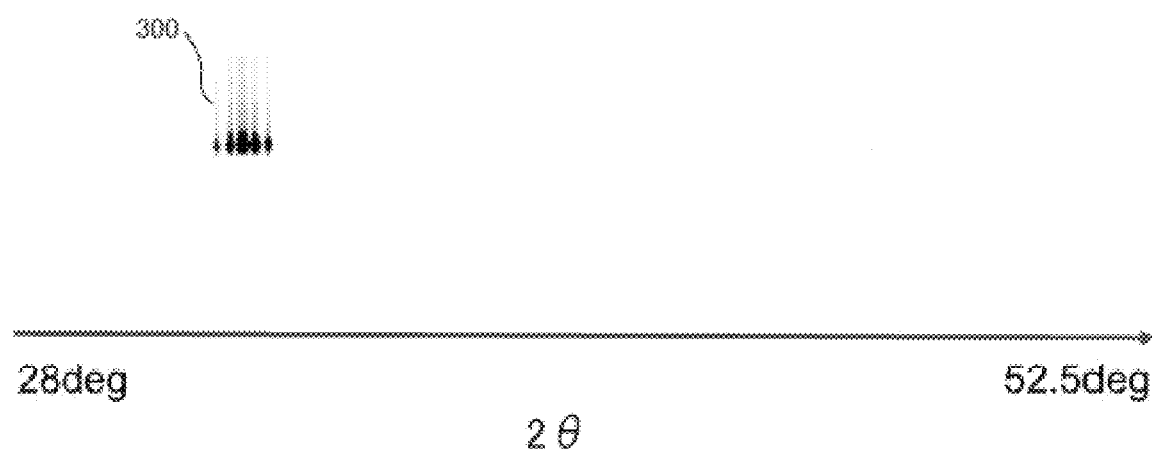
FIG. 6 illustrates in-plane diffraction spots obtained via the soller slit.

FIG. 6 illustrates in-plane diffraction spots 300 obtained via the soller slit 100. When performing X-ray diffraction measurement in a state where the soller slit 100 and the detector 205 are terminated as illustrated in FIG. 6, shadows of the thin plates 110 appear in the detected data. As a solution, it is possible to drive the in-plane arm 204 according to the TDI scheme and detect diffracted X-rays while moving the soller slit 100 and the detector 205. In such a case, it is possible to calculate the diffracted X-ray intensity at each position from the angle of move and the position on the detector 205.

According to the TDI scheme, X-rays are detected while moving the detector 205 continuously or stepwise at a predetermined speed, and imaging is performed by associating the positions of the detector 205 along its move with the detected positions on the detector 205 and by calculating the accumulated detection values for the positions. In such a case, timing of detection and the timing of move of the detector 205 are synchronized.

Figure 7:
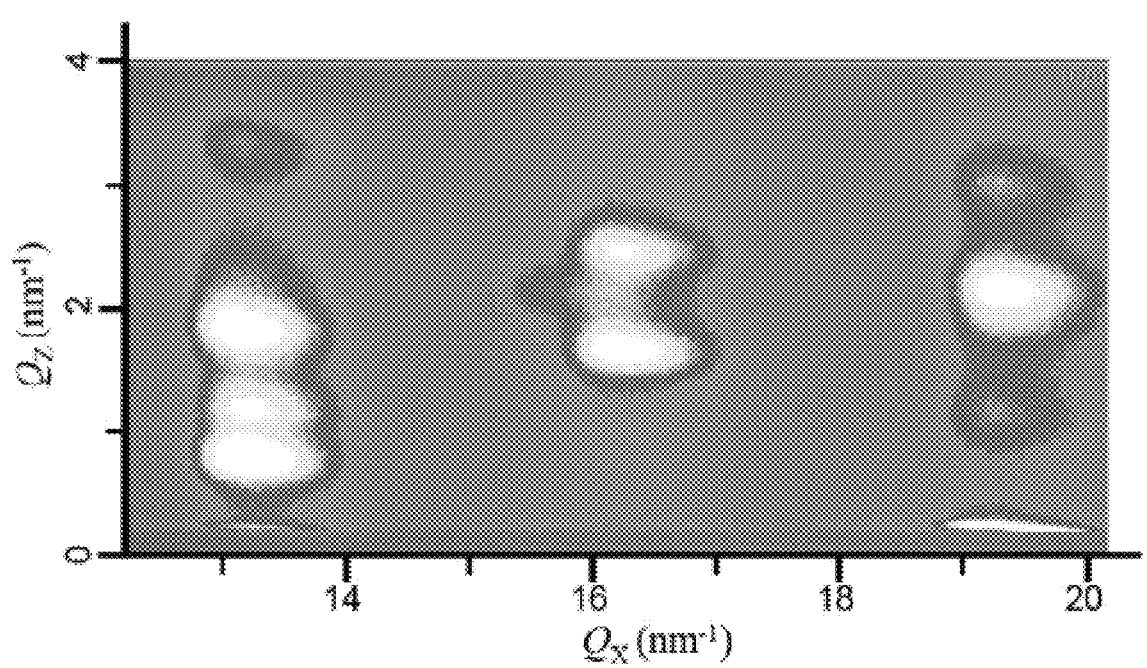
FIG. 7 illustrates an in-plane diffraction image obtained using TDI.
Figure 8:
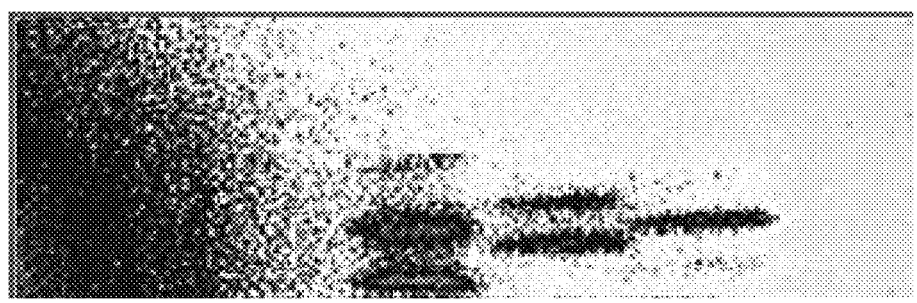
FIG. 8 illustrates conventional in-plane diffraction spots.

The provision as described above allows for detecting diffracted X-rays in a manner similar to simultaneously detecting along the moving direction of the detector 205, thereby eliminating the effect of obstacles that may appear in local X-ray detection. FIG. 7 illustrates an in-plane diffraction image obtained using the TDI scheme. The in-plane diffraction image has been obtained using thin film of pentacene (thickness: 150 nm) as a sample, via the TDI scheme with $2\theta\chi$ being 25°. Employing the TDI scheme allows for eliminating shadows of the thin plates 110 that may appear on diffraction spots. Note that even approx. 0.5° move by TDI is also effective (the same goes for the swing described below).

The X-ray diffraction apparatus 200 may further include a swing mechanism that allows the soller slit 100 to swing about a particular focus, and a swing control unit for controlling the drive of the swing mechanism. In such a case, the soller slit 100 is provided on a swing arm which is independent of the in-plane arm 204. Driving the swing arm by the swing mechanism causes the soller slit 100 to move at predetermined speed about the center G0 of the goniometer circle at the time of measurement. The swing control unit causes the swing arm to move the soller slit 100, with the sample S and the detector 205 being fixed at the time of measurement.

Moving the soller slit as described above allows for easily eliminating shadows of the thin plates that may appear when performing measurement with the detector 205 and the soller slit 100 being fixed. In such a case, however, a mechanism independent of the in-plane arm 204 is provided, and therefore the TDI scheme is more preferable in terms of cost.

While the above description constitutes the preferred embodiment of the present invention, it will be appreciated that the invention is susceptible to modification, variation and change without departing from the proper scope and fair meaning of the accompanying claims.

The invention claimed is:

1. An X-ray diffraction apparatus comprising:
a soller slit having a plurality of thin plates, each thin plate being perpendicular to a bottom surface and arcuately arranged with a predetermined angular interval between each other so as to pass X-rays in a radiating direction from a particular focus, the soller slit being provided at a position through which X-rays diffracted on a sample surface pass, the particular focus being the center of a goniometer circle, the sample being irradiated with the X-rays at an angle for GIXD (Grazing Incident X-ray Diffraction);
an X-ray source configured to irradiate line-focused X-rays on the sample;
an in-plane arm rotatably provided relative to the center of the goniometer circle; and
a photon-counting two dimensional detector provided on the in-plane arm and configured to detect diffracted X-rays which have passed through the soller slit, wherein
the soller slit is provided at a position through which X-rays diffracted on a crystal lattice plane perpendicular to the sample surface in the sample pass and a position where a diffraction angle resolution of the diffracted X-rays is depended on, a resolution in an in-plane direction of the soller slit being equal to or lower than 1°, the particular focus being the center of the goniometer circle, the X-rays being irradiated on the sample at an angle for GIXD (Grazing Incident X-ray Diffraction), and
the X-ray diffraction apparatus detects the diffracted X-rays with driving the in-plane arm.

2. The X-ray diffraction apparatus according to claim 1, further comprising:
a TDI control unit configured to calculate a detected X-ray intensity on a detected position in space, in accordance with the detected position of the X-ray intensity on the detector and the rotation angle of the in-plane arm.

3. The X-ray diffraction apparatus according to claim 1, further comprising:
a swing mechanism having the soller slit to allow the soller slit to swing with the particular focus as a center.

4. The X-ray diffraction apparatus according to claim 1, further comprising:
a sample table that rotatably supports the sample around an axis perpendicular to the sample surface, wherein
the sample table is rotated in accordance with the rotation of the in-plane arm, and the sample is rotated around an axis perpendicular to the sample surface.

5. The X-ray diffraction apparatus according to claim 1, further comprising:
a multilayer mirror that shapes the X-rays to be irradiated in a monochromatic and parallel beam, and
an in-plane PSC that increase the parallelism of the shaped X-rays.

6. A method of measuring diffracted X-rays using a soller slit having a plurality of thin plates, each thin plate being perpendicular to a bottom surface and arcuately arranged with a predetermined angular interval between each other so as to pass X-rays in a radiating direction from a particular focus, the soller slit being provided at a position through which X-rays diffracted on a crystal lattice plane perpendicular to the sample surface in the sample pass and a position where a diffraction angle resolution of the diffracted X-rays is depended on, a resolution in an in-plane direction of the soller slit being equal to or lower than 1°, the particular focus being the center of a goniometer circle, the sample being irradiated with the X-rays at an angle for GIXD (Grazing Incident X-ray Diffraction);
the method comprising:
a step of providing the soller slit at a position through which X-rays diffracted on a sample surface pass, the particular focus being the center of a goniometer circle; and
a step of irradiating line-focused X-rays on the sample at an angle for GIXD (Grazing Incident X-ray Diffraction), and detecting X-rays diffracted by the sample, with a photon-counting two-dimensional detector via the soller slit in accordance with the rotation of the in-plane arm rotatably provided relative to the center of the goniometer circle.

* * * * *